Sept. 17, 1940.  L. L. HAAS  2,215,101

CONNECTOR FOR TUBULAR MEMBERS

Filed March 17, 1939

INVENTOR.
Lucien L. Haas
By Parker, Rockwood + Farmer
ATTORNEYS.

Patented Sept. 17, 1940

2,215,101

UNITED STATES PATENT OFFICE 2,215,101

CONNECTOR FOR TUBULAR MEMBERS

Lucien L. Haas, Youngstown, Ohio, assignor to MacKenzie Muffler Company, Inc., Youngstown, Ohio Application March 17, 1939, Serial No. 262,453

2 Claims. (Cl. 285—185)

This invention relates to improvements in tubular connectors or adaptors of the kind which may be used for connecting two tubular members.

One of the objects of this invention is to provide a tubular connection of improved and simplified construction which may be used for connecting two tubular members. Another object of this invention is to provide a tubular connector which can be easily and quickly secured in place, and which is of strong and rigid construction. A further object of the invention is to provide a connector of this type which forms a positive connection with at least one of the tubular members, and in which such tubular member is provided with an outwardly extending projection or part which may be formed integral therewith without perforating the tubular member.

Another object of this invention is to provide a connector with outwardly extending ears or lugs of reinforced construction and of greatly increased resistance to bending by a clamping bolt.

Other objects of the invention will appear from the following description and claims.

In the accompanying drawing, I have shown my improved connection for tubular members as used in connection with the securing of a gas conducting pipe to a muffler, but it will be understood that it is not intended to restrict this invention for use in connection with mufflers, since the same may obviously be used for securing together any two tubular members.

Figure 1:
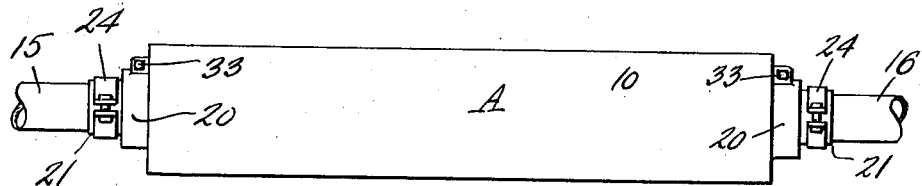
Fig. 1 is a side view of a muffler having exhaust and tail pipes secured thereto by means of connectors embodying this invention.
Figure 2:
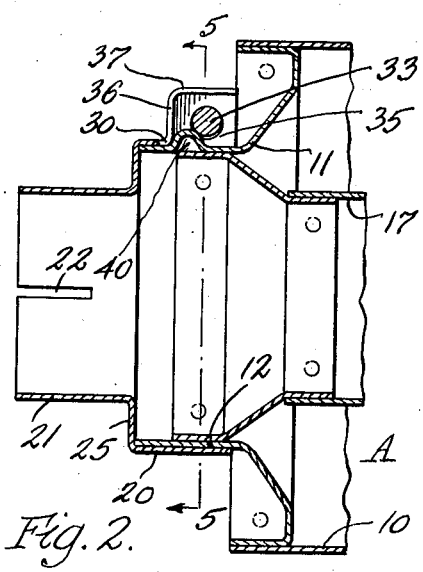
Fig. 2 is a fragmentary longitudinal sectional view, on an enlarged scale, of one end of the muffler, and a connector, the section being taken on line 2—2, Fig. 3.
Figure 3:
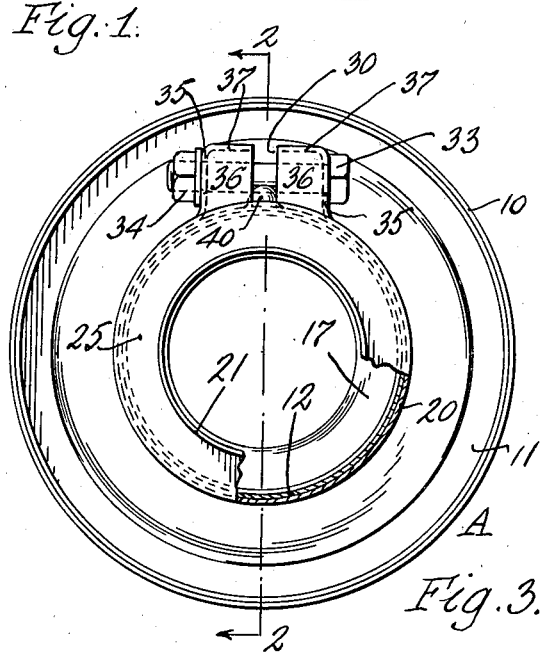
Fig. 3 is an end view thereof, partly in section.
Figure 4:
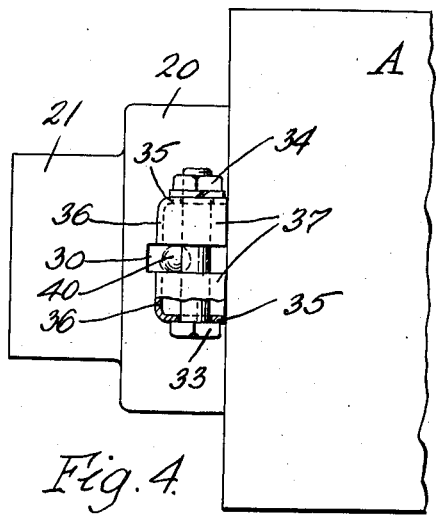
Fig. 4 is a fragmentary side view thereof.
Figure 5:
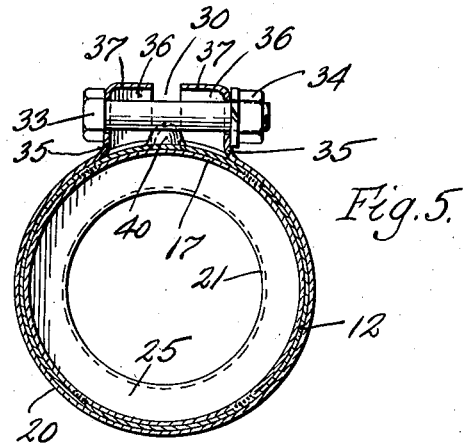
Fig. 5 is a section thereof, on line 5—5, Fig. 2.

A represents a muffler, which includes an outer shell 10 extending about the usual silencing means and passages of a muffler, which are not shown. The outer shell 10 is provided at opposite ends thereof with heads which in turn are provided with short tubular inlet and discharge ducts to which the exhaust and tail pipes may be connected. One of these heads 11 is shown in Figs. 2 to 5 and this head may be welded or otherwise secured to the shell 10 and includes a tubular duct or extension 12. This duct or tubular extension of the muffler head 11 constitutes one of the two tubular members which are to be connected by means of my improved connection. As shown in Fig. 1, an exhaust pipe 15 is connected to one head of the muffler and a tail pipe 16 to the other head thereof, and either of these pipes constitute, in the construction shown, the other tubular member with which my invention deals. The head 12 may also support a conduit or shell 17 or other parts of the muffler.

In accordance with my invention, I provide a tubular connector which includes a substantially cylindrical part 20, which is so formed as to telescope about the tubular part 12, and another cylindrical part 21 which is arranged to telescopically engage the other tubular member. The cylindrical part 21 may be of any desired or suitable form, that shown being provided with a slot 22 so that this cylindrical part 21 may be contracted about a tubular member such, for example, as the exhaust pipe 15, by any suitable means, such for example as a clamping ring 24 of any suitable or usual construction, such for example as shown in Fig. 1. Any other suitable or usual means may be provided for securing the cylindrical part 21 of the connector to a tubular member.

In the particular construction shown, the cylindrical part 21 of the connector is of smaller diameter than the cylindrical part 20 and these two cylindrical parts may be connected by means of a radially extending annular flange or web 25. While I have illustrated the connector as having the cylindrical part 20 thereof of larger diameter than the part 21, it will be understood that these two cylindrical parts may be of the same diameter, or if desired, the part 21 may be of larger diameter than the part 20.

My invention is illustrated in the accompanying drawing as applied to the connection between the cylindrical part 20 of the connector and the tubular member 12. This cylindrical part 20 is provided with a longitudinally extending slot 30 extending inwardly from the open end of the cylindrical part 20 and preferably terminating at a distance from the transverse wall or web 25 of the connector. At opposite sides of the slot 30, ears or lugs are formed through which a clamping bolt 33 may extend so that when the nut 34 of the clamping bolt is tightened, the cylindrical part 20 will be contracted about the tubular member 12. These ears or lugs are preferably stamped or formed integral with the cylindrical part 20 of the connector and each includes an outwardly extending wall or web 35 having a hole through which the bolt 33 extends. The ears or lugs also include reinforcing flanges 36 and 37 which reinforce the webs or walls 35 to enable these walls to better resist bending due to the pressure exerted on them by the bolt during its clamping action. Ears or lugs of the shape described can readily be formed out of the metal of the cylindrical part 20 of the connector, and consequently, require no additional parts, the entire ears or lugs, including the walls or webs 35 and the reinforcing flanges 36 and 37 integral with each other and with the cylindrical part 20. By means of this construction, it will be noted that each wall or web 35 is reinforced on one side by the flange 36 which is integral therewith and with the cylindrical part 20 and the outer edge of each wall or web is reinforced against bending by the outer flange 37, which is integral with the wall or web 35 and the other flange 36. The reinforcing flanges, consequently, greatly increase the resistance of the walls or webs 35 against bending or deformation due to the pressure applied thereto by the bolt 33 when the cylindrical part 20 is contracted about the tubular member 12.

It will also be noted that by means of the construction shown, the walls or webs 35 are spaced at a considerable distance from the slot 30. This, consequently, makes it possible to position the bolt 33 so that the middle portion thereof extends closer to the tubular member 12, the advantage of which will be hereafter pointed out.

Another feature of my invention is the provision of a stop or abutment on the tubular member cooperating with the cylindrical part 20, which stop or abutment extends outwardly from the tubular member in such a manner that it may engage the clamping bolt 33 when in its operative position, and thus form a positive stop for preventing the movement of the connector from its tubular member. This stop or projection may be formed in any suitable or desired manner, and in the construction shown, a boss or projection 40 is formed on the tubular member 12 by pressing out a portion of the metal of this tubular member, this being preferably done without severing or breaking the metal.

This construction has the advantage that since the tubular member 12 is not cut or broken by forming the boss 40 therein, no gas leaks will develop at this point. This construction is rendered possible by the fact that the ears or lugs described enable the middle portion of the bolt 33 to extend into close proximity to the tubular member 12, so that merely a boss or projection on the metal is sufficient to form a positive stop to hold the connector on the tubular member 12.

In positioning the connector on the tubular member 12, it is preferably so arranged that the boss or projection 40 is approximately alined with the slot 30, and the bolt holes in the lugs 31 and 32 are so formed that the bolt will engage the inner portion of the boss or projection 40. Consequently, when the bolt is tightened to contract the cylindrical part 20 about the tubular member 12, the boss 40 will lie in the way of the movement of the bolt, if the connector is moved in a direction to become unfastened from the tubular member 12. By means of this boss, a lock is, consequently, formed, which assures a positive connection between the connector and the tubular member 12. While I have shown an integrally formed and outwardly pressed boss 40 in the drawing, yet it will be obvious that any form of projection, whether integrally formed or secured to the tubular member 12 may be employed.

While I have shown my improved clamping or securing means applied to only one of the cylindrical parts of the connector, it will be obvious that, if desired, similar clamping means could also be employed in connection with the cylindrical part 21 of the connector, in place of the clamping ring or band 24.

The connector described has the advantage that it is formed of a single piece with the ears or lugs and the ears are reinforced so that their resistance to bending is very greatly increased. By providing a boss or projection 40, which may be integrally pressed outwardly from the tubular member 12 without perforating this member, leakage of fluid out of the tubular member 12 is avoided, without the provision of any additional means for preventing such leakage.

Connectors of the type illustrated are particularly desirable for use in connection with mufflers in order to enable the muffler to be applied to exhaust and tail pipes of different diameters. Since these connectors are comparatively inexpensive and of relatively simple construction, a number of connectors having cylindrical parts 21 of different diameters may be supplied with mufflers and when a muffler is to be installed, it is merely necessary to select a connector having the cylindrical part 21 of the desired diameter to fit the tail or exhaust pipe. Obviously, however, my improved connection may be used for other purposes.

The connector described is particularly desirable for use in coupling the ducts of mufflers to tail pipes or exhaust pipes, for the reason that the ducts formed on the mufflers are generally of thinner metal than the tail or exhaust pipes, and it is also desirable to make the connectors themselves of relatively light metal. Consequently, the reinforced projections on the cylindrical clamping part of the connector are well adapted for use in connection with lighter metal, and the use of the boss 40 for cooperation with the bolt provides a positive holding of the connector on the muffler duct, so that excessive pressure need not be applied by the bolt 33. On the other hand, the cylindrical part 21 of the connector can be drawn very tightly into engagement with the relatively heavy tail or exhaust pipe, and the clamping ring 24 may be of relatively heavy metal, so that it is not necessary to use on the cylindrical part 21 of the connector the construction employed in connection with the part 20.

I claim as my invention:

1. A connector for tubular members, said connector including a telescoping part adapted to extend about one of said tubular members and having a longitudinally extending slot formed therein, outwardly extending projections on said telescoping part arranged at opposite sides of said slot and having holes formed therein, a bolt extending through said holes for drawing said telescoping parts toward each other, and a retaining boss on said tubular member and interposed between said bolt and the adjacent end of said tubular member and arranged to engage said bolt for preventing movement of said connector toward said end of said tubular member.

2. A connector for tubular members, said connector including a telescoping part adapted to extend about one of said tubular members and having a longitudinally extending slot formed therein, outwardly extending projections on said telescoping part arranged at opposite sides of said slot, a reinforcing flange for each of said projections, said flange extending from a projection toward said slot to said telescoping part, a bolt engaging said projections for urging the same toward each other to clamp said connector on said tubular member, and a retaining boss on said tubular member and interposed between said bolt and the adjacent end of said tubular member and arranged to engage said bolt for preventing movement of said connector toward said end of said tubular member.

LUCIEN L. HAAS.